US010493483B2

(12) United States Patent
Johnson (10) Patent No.: US 10,493,483 B2
(45) Date of Patent: Dec. 3, 2019

(54) CENTRAL FED ROLLER FOR FILAMENT EXTENSION ATOMIZER

(71) Applicant: PALO ALTO RESEARCH CENTER INCORPORATED, Palo Alto, CA (US)

(72) Inventor: David Mathew Johnson, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 116 days.

(21) Appl. No.: 15/651,195

(22) Filed: Jul. 17, 2017

(65) Prior Publication Data

US 2019/0015862 A1 Jan. 17, 2019

(51) Int. Cl.

*B05B 17/04* (2006.01)
*B05D 1/02* (2006.01)
*B05B 3/02* (2006.01)
*B01J 13/00* (2006.01)
*B05B 3/00* (2006.01)

(52) U.S. Cl.

CPC .......... *B05B 17/04* (2013.01); *B01J 13/0095* (2013.01); *B05B 3/02* (2013.01); *B05D 1/02* (2013.01); *B05B 3/00* (2013.01)

(58) Field of Classification Search

CPC ... B05B 17/04; B05B 3/02; B05B 3/00; B01J 13/0095; B05D 1/02
USPC .................. 239/214, 220; 401/197, 203, 204
See application file for complete search history.

(56) References Cited

U.S. PATENT DOCUMENTS 2,291,046 A 7/1942 Lange
2,551,582 A 5/1951 Carlson
3,052,213 A 9/1962 Schaffert
3,068,115 A 12/1962 Gundlach
(Continued)

FOREIGN PATENT DOCUMENTS

EP 2227834 8/2011
EP 2868390 5/2015
(Continued)

OTHER PUBLICATIONS

McClure, Max, "Stanford Researchers' Cooling Glove Better than Steroids—and Helps Solve Physiological Mystery Too", Stanford Report, Aug. 29, 2012, 3 pages, retrieved from the Internet: http://news.stanford.edu/news/2012/august/cooling-glove-research-082912.html, retrieved on Dec. 19, 2014.
(Continued)

*Primary Examiner* — Steven J Ganey
(74) *Attorney, Agent, or Firm* — Miller Nash Graham and Dunn

(57) ABSTRACT

A roller has an outer cylindrical surface having an array of holes, a central feed channel inside the roller, and vanes connecting the channel to the holes, forming a path for liquid between the channel and the holes. An atomization system having a fluid reservoir; a pair of rollers, at least one of the rollers having: a central feed channel, the channel fluidically connected to the fluid reservoir, an array of holes on a surface of the roller, and vanes connecting the channels to the holes, a nip formed between the rollers, and a receiving surface positioned to receive droplets formed when liquid exits the holes, stretches between the rollers as they counterrotate to form filaments and the filaments break into droplets.

13 Claims, 6 Drawing Sheets

(56) References Cited

U.S. PATENT DOCUMENTS

| | | | |
|---|---|---|---|
| 3,330,683 A | 7/1967 | Simm et al. | |
| 3,406,660 A | 10/1968 | Simm | |
| 3,554,815 A | 1/1971 | Otto | |
| 3,626,833 A | 12/1971 | Koch | |
| 3,649,829 A | 3/1972 | Randolph | |
| 2,296,861 A | 9/1972 | Albert | |
| 3,702,258 A | 11/1972 | Gibbons et al. | |
| 3,717,875 A | 2/1973 | Arciprete et al. | |
| 3,779,166 A | 12/1973 | Pressman et al. | |
| 3,797,926 A | 3/1974 | Fotland et al. | |
| 3,873,025 A | 3/1975 | Qvarnstrom | |
| 3,926,114 A | 12/1975 | Matuschke | |
| 3,977,323 A | 8/1976 | Pressman et al. | |
| 3,988,986 A | 11/1976 | Zimmer | |
| 4,011,993 A | 3/1977 | Mizuno et al. | |
| 4,034,670 A | 7/1977 | Zavodny | |
| 4,046,931 A | 9/1977 | Innes et al. | |
| 4,217,062 A * | 8/1980 | Trp .................... | B05C 17/0308 401/197 |
| 4,222,059 A | 9/1980 | Crean et al. | |
| 4,332,281 A | 6/1982 | Baba | |
| 4,384,296 A | 5/1983 | Torpey | |
| 4,860,652 A | 8/1989 | Kawata | |
| 4,993,320 A | 2/1991 | Kochsmeier | |
| 5,022,948 A | 6/1991 | Hallworth | |
| 5,103,763 A | 4/1992 | Goldowski et al. | |
| 5,123,350 A | 6/1992 | Fadner | |
| 5,127,325 A | 7/1992 | Fadner | |
| 5,191,703 A | 3/1993 | John | |
| 5,204,697 A | 4/1993 | Schmidlin | |
| 5,207,158 A | 5/1993 | Fadner et al. | |
| 5,216,952 A | 6/1993 | Hoff et al. | |
| 5,270,086 A | 12/1993 | Hamlin | |
| 5,314,119 A | 5/1994 | Watt | |
| 5,326,598 A | 7/1994 | Seaver et al. | |
| 5,332,472 A | 7/1994 | Cutright et al. | |
| 5,609,919 A | 3/1997 | Yuan et al. | |
| 5,835,114 A | 11/1998 | Nagata et al. | |
| 6,033,513 A | 3/2000 | Nakamura | |
| 6,125,756 A | 10/2000 | Nussel et al. | |
| 6,382,524 B1 | 5/2002 | James | |
| 6,399,143 B1 | 6/2002 | Sun et al. | |
| 6,576,861 B2 | 6/2003 | Sampath et al. | |
| 6,622,335 B1 | 9/2003 | Anderson et al. | |
| 6,934,142 B2 | 8/2005 | Grosse et al. | |
| 7,083,830 B2 | 8/2006 | Minko | |
| RE40,722 E | 6/2009 | Chappa | |
| 7,837,307 B2 | 11/2010 | Schmitt | |
| 8,132,744 B2 | 3/2012 | King et al. | |
| 8,272,579 B2 | 9/2012 | King et al. | |
| 8,273,286 B2 | 9/2012 | Fram | |
| 8,511,251 B2 | 8/2013 | Sato | |
| 8,522,711 B2 | 9/2013 | McNeil et al. | |
| 8,523,340 B2 | 9/2013 | Sabo et al. | |
| 8,552,299 B2 | 10/2013 | Rogers et al. | |
| 8,720,370 B2 | 5/2014 | Rebstock | |
| 8,742,246 B2 | 6/2014 | Toyoda et al. | |
| 9,021,948 B2 | 5/2015 | Pattekar | |
| 2001/0011511 A1 | 8/2001 | Kawabata et al. | |
| 2002/0053320 A1 | 5/2002 | Duthaler et al. | |
| 2003/0183099 A1 | 10/2003 | De Vroome | |
| 2003/0222950 A1 | 12/2003 | Jeanmaire | |
| 2004/0020382 A1 | 2/2004 | McLean et al. | |
| 2004/0050701 A1 | 3/2004 | McEntee et al. | |
| 2004/0079282 A1 | 4/2004 | Sano et al. | |
| 2004/0217184 A1 | 11/2004 | Seidel | |
| 2005/0000231 A1 | 1/2005 | Lee | |
| 2005/0250900 A1 | 11/2005 | Stofko | |
| 2006/0035033 A1 | 2/2006 | Tanahashi et al. | |
| 2006/0071978 A1 | 4/2006 | Steiner et al. | |
| 2007/0194157 A1 | 8/2007 | Golden et al. | |
| 2009/0011212 A1 | 1/2009 | Dubey | |
| 2009/0014046 A1 | 1/2009 | Yu et al. | |
| 2009/0032492 A1 | 2/2009 | Kunze-Concewitz | |
| 2009/0153627 A1 | 6/2009 | Barbet | |
| 2009/0155732 A1 | 6/2009 | Limb | |
| 2010/0017346 A1 | 1/2010 | Extrand et al. | |
| 2010/0064917 A1 | 3/2010 | Blanchard et al. | |
| 2010/0154856 A1 | 6/2010 | Yuichi et al. | |
| 2010/0221449 A1 | 9/2010 | Schlatterbeck et al. | |
| 2011/0011289 A1 | 1/2011 | Bohm et al. | |
| 2011/0017431 A1 | 1/2011 | Yang et al. | |
| 2011/0031100 A1 | 2/2011 | Qtaishat et al. | |
| 2011/0150036 A1 | 6/2011 | Lee et al. | |
| 2011/0154558 A1 | 6/2011 | Peter et al. | |
| 2011/0220147 A1 | 9/2011 | Schreiber et al. | |
| 2012/0103213 A1 | 5/2012 | Stowe et al. | |
| 2012/0145019 A1 | 6/2012 | Cheng et al. | |
| 2012/0145021 A1 | 6/2012 | Pfeil | |
| 2012/0227778 A1 | 9/2012 | Leonov | |
| 2013/0070031 A1 | 3/2013 | Nelson | |
| 2013/0087180 A1 | 4/2013 | Stark et al. | |
| 2014/0015901 A1 | 1/2014 | Marcus | |
| 2014/0146116 A1 | 5/2014 | Paschkewitz | |
| 2015/0062250 A1 | 3/2015 | Byun et al. | |
| 2015/0075442 A1 | 3/2015 | Byun et al. | |
| 2015/0115057 A1 | 4/2015 | Beck et al. | |
| 2015/0119477 A1 | 4/2015 | Beck et al. | |
| 2015/0190824 A1 | 7/2015 | Nardi et al. | |
| 2015/0197063 A1 | 7/2015 | Shinar et al. | |
| 2015/0343407 A1 | 12/2015 | Johnson et al. | |
| 2015/0343468 A1 | 12/2015 | Johnson et al. | |
| 2015/0343477 A1 | 12/2015 | Johnson et al. | |
| 2016/0229119 A1 | 8/2016 | Renn | |
| 2016/0326386 A1 | 11/2016 | Toyserkani et al. | |
| 2017/0203504 A1 | 7/2017 | Johnson et al. | |

FOREIGN PATENT DOCUMENTS

| | | |
|---|---|---|
| FR | 1035235 | 8/1953 |
| WO | 93/13897 | 7/1993 |
| WO | 97/09125 | 3/1997 |
| WO | 2004028707 | 4/2004 |
| WO | 2006122645 | 11/2006 |
| WO | 201183644 | 12/2015 |

OTHER PUBLICATIONS

Matheson, Rob, "Cool Invention Wins First Place at MADMEC", MIT News Office, Oct. 17, 2013, 3 pages, retrieved from the Internet: http://newsoffice.mit.edu/2013/madmec-design-competition-1017, retrieved on Dec. 19, 2014.

Vanhemert, Kyle, "MIT Wristband Could Make AC Obsolete", Wired.com, Oct. 30, 2013, retrieved from the Internet: http://www.wired.com/2013/10/an-ingenious-wristband-that-keeps-your-body-at-theperfect-temperature-no-ac-required/, retrieved on Dec. 19, 2014.

Francioso, L., "Flexible thermoelectric generator for ambient assisted living wearable biometric sensors", Journal of Power Sources, vol. 196, Issue 6, Mar. 15, 2011, pp. 3239-3243.

http://www.stacoolvest.com/, retrieved on Dec. 19, 2014.

http://www.steelevest.com/, retrieved on Dec. 19, 2014.

http://veskimo.com/, retrieved on Dec. 19, 2014.

http://glaciertek.com/, retrieved on Dec. 19, 2014.

Chen, A., "Dispenser-printed planar thick-film thermoelectric energy generators," J. Micromech. Microeng., 21(10), 2011.

Hewitt, A.B., "Multilayered Carbon Nanotube/Polymer Composite Based Thermoelectric Fabrics," Nano Letters, 12 (3), pp. 1307-1310, 2012.

Arens, E., "Partial- and whole-body thermal sensation and comfort—Part I: Uniform environmental conditions," Journal of Thermal Biology, vol. 31, Issues 1-2, Jan. 2006, pp. 53-59.

Arens, E., "Partial- and whole-body thermal sensation and comfort—Part II: Non-uniform environmental conditions," Journal of Thermal Biology, vol. 31, Issues 1-2, Jan. 2006, pp. 60-66.

Bullis, Kevin, "Expandable Silicon", MIT Technology Review, Dec. 14, 2007, URL: http://www.technologyreview.com/news/409198/expandable-silicon/, retrieved from the Internet on Dec. 23, 2014.

"Ortho-Planar Spring", BYI Mechanical Engineering Website, URL: http://compliantmechanisms.byu.edu/content/ortho-planar-spring, retrieved from the Internet on Dec. 23, 2014.

(56) References Cited

OTHER PUBLICATIONS

S.-J. Kim, J.-H. Wea and B.-J. Cho: "A wearable thermoelectric generator fabricated on a glass fabric," Energy Environmental Science, 2014.
L. Francioso, C. De Pascali, A. Taurino, P. Siciliano, A. De Risi: "Wearable and flexible thermoelectric generator with enhanced package," In Proc. SPIE 8763, Smart Sensors, Actuators, and MEMS VI, 876306, May 2013.
C. Huizenga, H. Zhang, E. Arens, D. Wang: "Skin and core temperature response to partial-and whole-body heating and cooling," Journal of Thermal Biology, vol. 29, Issues 7-8, Oct.-Dec. 2004, pp. 549-558.
Sholin, V. et al.: "High Work Function Materials for Source/Drain Contacts in Printed Polymer Thin Transistors," Applied Physics Letters, vol. 92, 2008.
Zhou, Li, et al.: "Highly Conductive, Flexible, Polyurethane-Based Adhesives for Flexible and Printed Electronics," Advanced Functional Materials, vol. 23, pg. 1459-1465, wileyonlinelibrary.com.
Bhat, Pradeep P., "Formation of beads-on-a-string structures during break-up of viscoelastic filaments," Aug. 2010, vol. 6:625-631, Nature Physics, 7 pages.
Le, Hue P., "Progress and Trends in Ink-jet Printing Technology," Jan./Feb. 1998, vol. 42:49-62, Journal of Imaging Science and Technology, 16 pages, found at: http://www.imaging.org/ist/resources/tutorials/inkjet.cfm.
Oliveira, Monica S., "Iterated Stretching, Extensional Rheology and Formation of Beads-on-a-String Structures in Polymer Solutions," Jan. 20, 2006, Special Issue of JNNFM on Extensional Flow, MIT, Cambridge, MA, 36 pages.
Owen, M., "Misting of non-Newtonian Liquids in Forward Roll Coating," Jul. 13, 2011, Journal of Non-Newtonian Fluid Mechanics, vol. 166:1123-1128, 6 pages.
Shi, X.D., "A Cascade of Structure in a Drop Falling from a Faucet," Jul. 8, 2004, vol. 265:219-222, Science, 4 pages.
Chapter 15, "Ink Jet Printing", 14 pages, found at http://www.lintech.org/comp-per/15INK.pdf.
Marple, A. and Liu, Y.H.: "Characteristics of Laminar Jet Impactors", Environmental Science & Technology, vol. 8, No. 7, Jul. 1974, pp. 648-654.
Bailey, Adrian G.: "The Science and technology of electrostatic powder spraying, transport and coating", Journal of Electrostatics, vol. 45, 1998, pp. 85-120.
Domnick, et al.: "The Simulation of Electrostatic Spray Painting Process with High-Speed Rotary Bell Atomizers. Part II: External Charging", Part. Part. Syst. Charact. vol. 23, 2006, pp. 408-416, URL: http://www.ppsc-journal.com.
Kelly, Ryan T, et al.: "The ion funnel: theory, implementations, and applications", Mass Spectrometry Reviews, vol. 29, 2010, pp. 294-312.
Crowe, Clayton et al.: "Multiphase Flows With Droplets and Particles", CRC Press, LLC, 1998.
N. N.: "Filament Extension Atomizer, Next Generation Spray Technology for Difficult Spray Materials," Sep. 8, 2016, found at https://www.parc.com/content/attachments/FEA-Spray_fact_sheet_20160808.pdf.
Bingheng et al., "Development Trends in Additive Manufacturing and 3D Printing," Engineering 2015, 2015(1)(1); 85-89.
Barry et al., "Printing nanopartical building blocks from gas phase using nanoxerography," Applied Physics Letters, 83 (26), Dec. 29, 2003, 5527-.
Joo et al., "Ultrafast patterning of nanoparticles by electrostatic lithography," J. Vac. Sci. Technol. B 24(6) Nov./Dec. 2006, 3205-3208.
Kang et al., Assembly of charged aerosols on non-conducting substrates via ion-assisted aerosol lithography (IAAL), Particuology, 33 (2017) 17-23.
Lee et al., "Three-Dimensional Assembly of Nanoparticles from Charged Aerosols," Nano Letters 11 (2011) 119-124.
Lenggoro, et al., "Nanoparticle assembly on patterned "plus/minus" surfaces from electrospray of colloidal dispersion," J. of Colloid and Interface Science 303 (2006) 124-130.
Lim et al., "Nanoxerography utilizing bipolar charge patterns," Applied Physics Letters 101 (2012) 203106(1-5).

* cited by examiner

CENTRAL FED ROLLER FOR FILAMENT EXTENSION ATOMIZER

RELATED APPLICATIONS

This application is related to the following US Applications and Patents:

US Patent Publication No. US2015011947, "Method of Creating an Aerosol by Stretching Filaments Between Two Diverging Surfaces," (20120933US01-9841-0297);

US Patent Publication No. US20150343477, "System for Creating Aerosoles by Stretching Filaments," (20120989US01-9841-0298);

US Patent Publication No. US20150115057, "System for Creating Aerosoles by Stretching Filaments," (20120933US02-9841-0307);

US Patent Publication No. US20150210009, "Spray Deposition System," (20131054US01-9841-0344);

US Patent Publication No. US20150343468, "System for Creating Aerosols by Stretching Filaments," (20120989US02-9841-0348);

U.S. Pat. No. 9,257,056, "System for Creating Aerosols by Stretching Filaments," (20120989US03-9841-0349);

US Patent Publication No. 20160175856, "Spray Deposition System," (20140451US01-9841-0365);

U.S. patent application Ser. No. 14/575,922, "System for Creating Aerosols by Stretching Filaments," (20140868US01-9841-0383);

U.S. patent application Ser. No. 15/001,408, "System Using Aerosol Generation and Selective Charging," (20150609US01-9841-0410); and U.S. patent application Ser. No. 15/001,452, "Method Using Aerosol Generation and Selective Charging," (20150609US01-9841-0410).

TECHNICAL FIELD

This disclosure relates to aerosol spray systems, more particularly to filament extension atomizer systems.

BACKGROUND

Palo Alto Research Center, Inc. ("PARC") has developed a filament extension atomizer system that generates aerosols from liquids. The system generally involves stretching a liquid filament between two diverging surfaces until the filament breaks up into a spray of droplets. In some versions of the system, the fluid input to the system involves doctor blades and the pressure formed between the two surfaces. In one version, the two surfaces are rollers and the rollers form a nip between them to distribute the fluid.

Typically, for most fluids this is very effective. However, fluids having extremely high surface tensions will either be flung off the high-speed rollers or not flow through tight contact blade set ups. In addition, the use of doctor blades and nips to control the film limit the ability of the droplet size to be altered. A single roller can only simultaneously produce a single set of droplets. In some cases, it may be highly desirable to create small droplets of a range of sizes. To accomplish this, the system must form a range of filaments without reliance on a doctor blade and feed system to introduce the fluid into the system.

SUMMARY

An embodiment is a roller having an outer cylindrical surface having an array of holes, a central feed channel inside the roller, and vanes connecting the channel to the holes, forming a path for liquid between the channel and the holes.

Another embodiment is an atomization system having a fluid reservoir, a pair of rollers, at least one of the rollers having a central feed channel, the channel fluidically connected to the fluid reservoir, an array of holes on a surface of the roller, and vanes connecting the channels to the holes, a nip formed between the rollers, and a receiving surface positioned to receive droplets formed when liquid exits the holes, stretches between the rollers as they counterrotate to form filaments and the filaments break into droplets.

Another embodiment is a method of generating droplets, the method providing a fluid to a first roller having a central feed channel, vanes between the central feed channel and a surface of the roller, the surface of the roller having holes to form surface droplets, and contacting the first roller with a second roller, the second roller to pull the fluid away from the first roller to form a filament, and stretching the filament to form droplets.

DETAILED DESCRIPTION OF THE EMBODIMENTS

Figure 1:
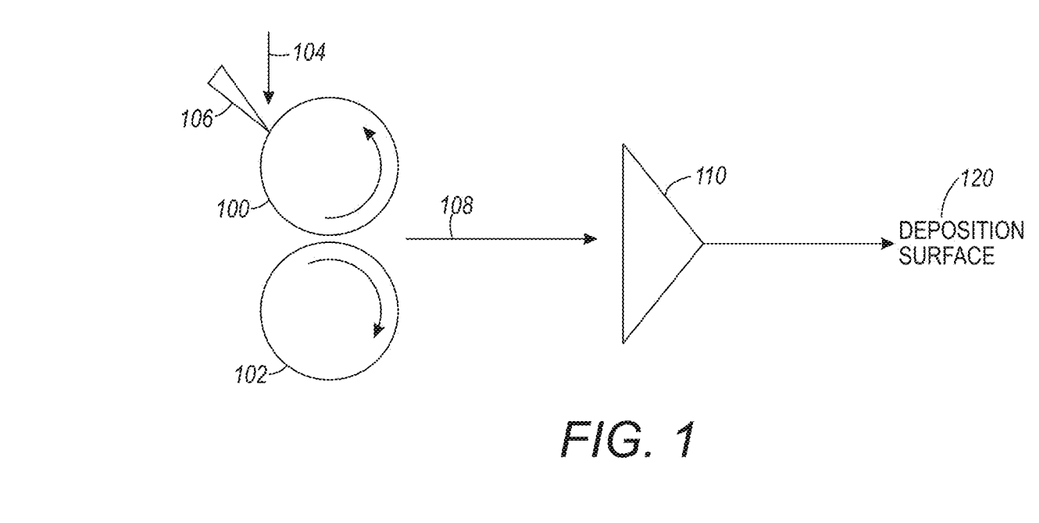
FIG. 1 shows an embodiment of a filament extension atomization system.

FIG. 1 shows a filament extension atomizer system. In this system, a pair of counterrotation rollers 100 and 102 form a nip (not labeled) between them. In the embodiment of FIG. 1, the system applies a liquid 104 to be aerosolized to one of the rollers, in this case roller 100. A metering, or doctor, blade 106 smooths the liquid into a more uniform thin film. As the liquid contacts the other roller, the liquid adheres to both rollers. When the surfaces of the rollers diverge from each other, the liquid forms into filaments that stretch between the diverging surface. Eventually, as the rollers continue to rotate the filament bursts into a spray of droplets. The system transports the spray droplets 108 to a spray collector or other apparatus 110 that further processes the spray. Further processing may involve depositing the material on a surface or changing the temperature of the material such that it undergoes a phase change.

Figure 2:
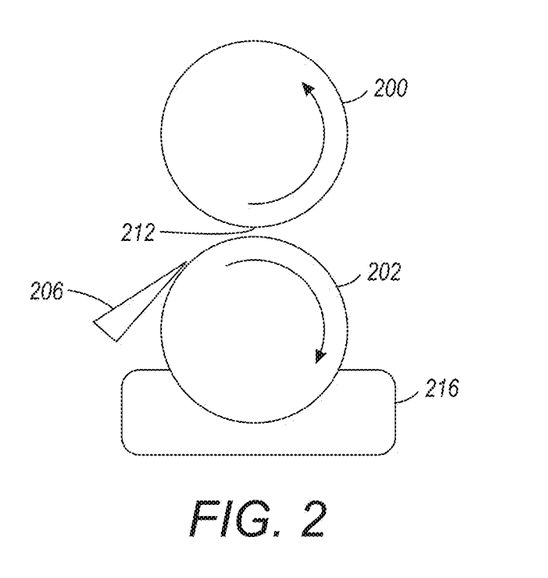
FIG. 2 shows a more detailed view of a pair of counter-rotating rollers and their liquid system.

FIG. 2 shows an alternative arrangement of the liquid coating of the one rollers. In the embodiment of FIG. 2, one of the rollers 202 rotates through a liquid repository 216 and picks up a layer of the liquid. The doctor blade 206 smooths out the layer before it enters the nip between the rollers 202 and 200.

In either of the above embodiments, as well as many others, the approach works well for most fluids. Fluids having a high surface tension, however, will either not pass under the doctor blade and result in a thin film, causing it to build up behind the doctor blade. Alternatively, the fluid that reaches the diverging roller surfaces will not form filaments, but instead the roller will fling the liquid off because the surface tension of the liquid will not allow it to form filaments.

Figure 3:
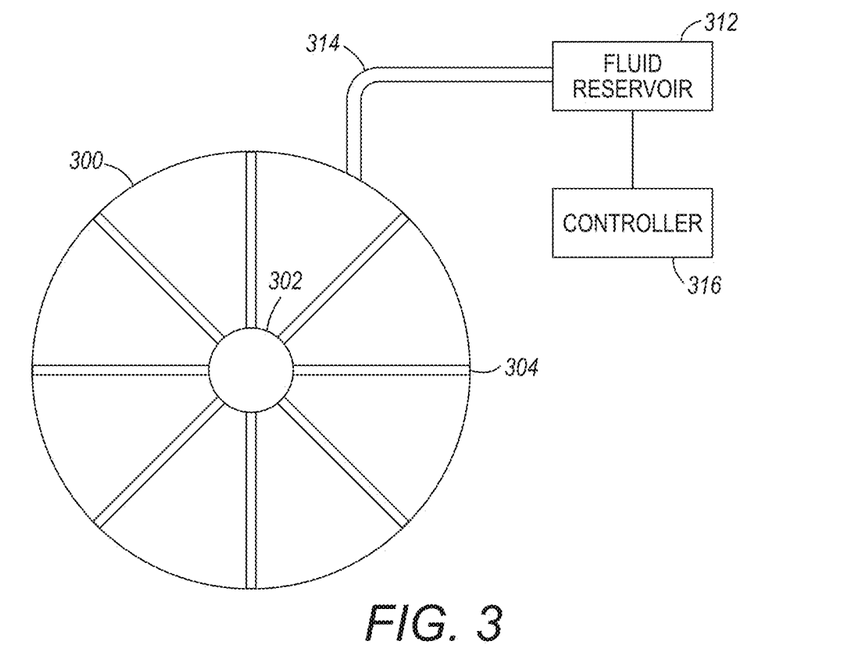
FIG. 3 shows an embodiment of a central fed roller with vanes.

The embodiments here alter the feed location of the polymer to make the feed integral to the roller itself, shown in FIG. 3. A roller 300 receives centrally fed fluid through a coupling that allows the liquid to flow into a hollow center channel 302 of the typically cylindrical roller. Holes drilled into the rollers may form the hollow channel. Vanes such as 304 that connect the channel to the surface of the roller allow the fluid to flow from the central channel to an array of holes on the surface of the roller. The holes penetrate the roller through to the vanes.

The centrally fed roller connects, typically through some sort of conduit 314 to a fluid reservoir 312. As will be discussed in more detail later, a controller 316 may regulate the pressure of the fluid being delivered to the central channel Regulation of the pressure may also or instead involve geometric elements, discussed in more detail below. In addition, the conduit may consist of more than one individual conduit and the pressure in each may be controlled with different pressures.

Figure 4:
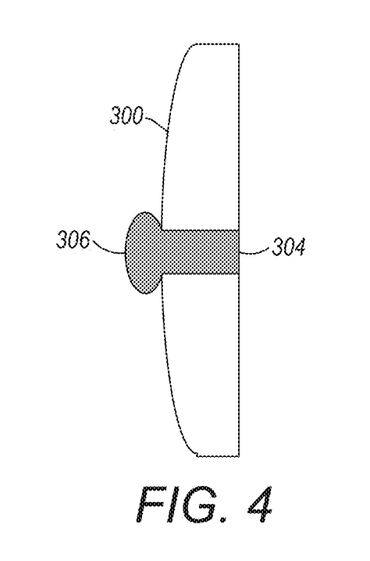
FIG. 4 shows a side view of an embodiment of a vane and an aperture on the surface.

A side profile of a hole is shown in FIG. 4. The vane 304 traverses from the channel 302 of FIG. 3, and the hole penetrates to the surface of the roller 300. This allows the fluid to form surface droplets such as 306 shown in FIG. 4. The holes can have a range of holes and shapes allowing for different filament sizes. Using differently sized holes allows for formation of different sizes of surface droplets, that leads to differently sized filaments using one pressure in the channel, or the user of several pressures with several sized holes may offer even more selectability.

The holes can have constant sizes and shapes throughout. Alternatively, they could result from a core having larger diameter holes and then encasing the core in another material. This would allow for smaller holes similar to a nozzle plate. The system may also allow for more complex recessed and protruded holes. Recessed holes have the advantage of higher sensitivity to backpressure and protruded holes may increase the ability of the roller to handle excess fluid.

Figure 5:
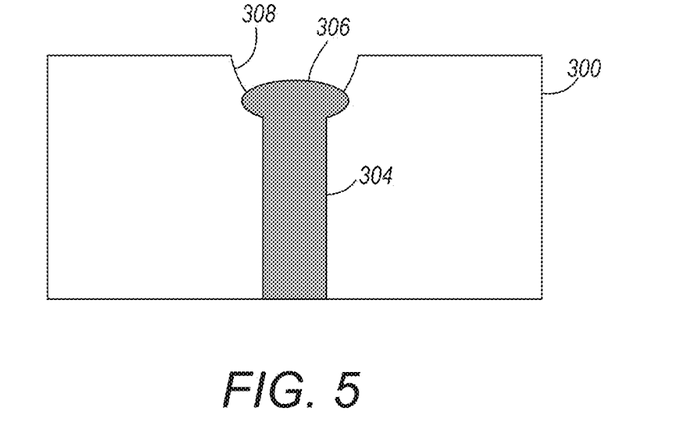
FIG. 5 shows a side view of an embodiment of a vane with a recessed aperture.

FIG. 5 shows an embodiment of a recessed hole 308. The hole has a portion that lies lower than the surface of the roller. Control of the back pressure of the fluid in turn controls the size of the droplet that protrudes past the top of the channel into the recessed portion 308. As the pressure is increase, fluid bubble 306 protrudes further and further out from the surface. The thickness of this protrusion, effectively changes the amount of material that is pulled into a filament. By changing this backpressure, the amount of fluid protruding can be changed and the droplet size can be changed. This can be changed globally, if all the channels are connected to each other, but can also be changed on a channel by channel basis either through geometric constraints that narrow or widen the channel, which alter the pressure and drop size, or through being connected to a different pressure source.

The portion of the recessed surface that receives fluid may be referred to here as the wetted portion. This may also achieve a negative film thickness. A negative film thickness as used here means that the droplet does not protrude from the surface as shown in the figure. Typically, this roller is used in the presence of a deformable roller as the other roller. Since the other roller is able to deform, even with a negative film thickness, the droplet will make contact with the other roller and it will continue to spray.

Figure 6:
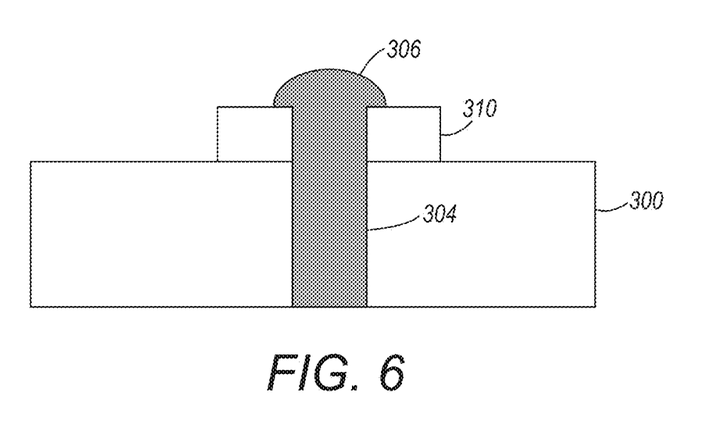
FIG. 6 shows a side view of an embodiment of a vane with a protruding aperture.

In another embodiment, the hole may have a protrusion 310 that causes the droplet 306 to form at an offset distance from the surface of the roller 300. The protruded hole can function similarly to the recessed hole. Different backpressures will cause different sized bubbles to protrude different amount and create different sized filaments and droplets. However, the protruded system provides for an area in which unused or excess fluid can be collected (the open area). This can be an advantage if not all material is sprayed, there are deviations in pressure control, or it is desirable to clean the fluid off during every revolution. In this case, the excess fluid will collect in the open area. Additionally, the corner of the protrusion will be a highly desirable place to pin the fluid droplet. A large amount of pressure will be required for the fluid to wet a larger area and round that corner. This highly stable pinning point provides for a more stable pressure control since it will not be as sensitive to small changes in pressure.

Figure 7:
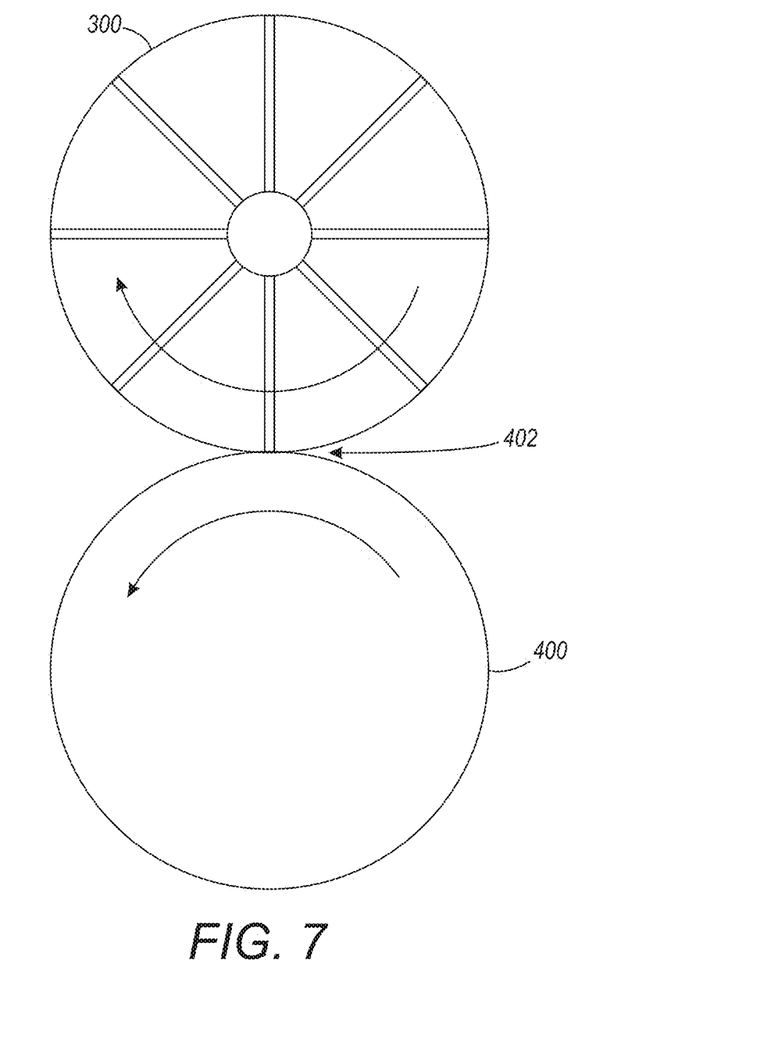
FIG. 7 shows a central fed roller as a pair of rollers.
Figure 8:
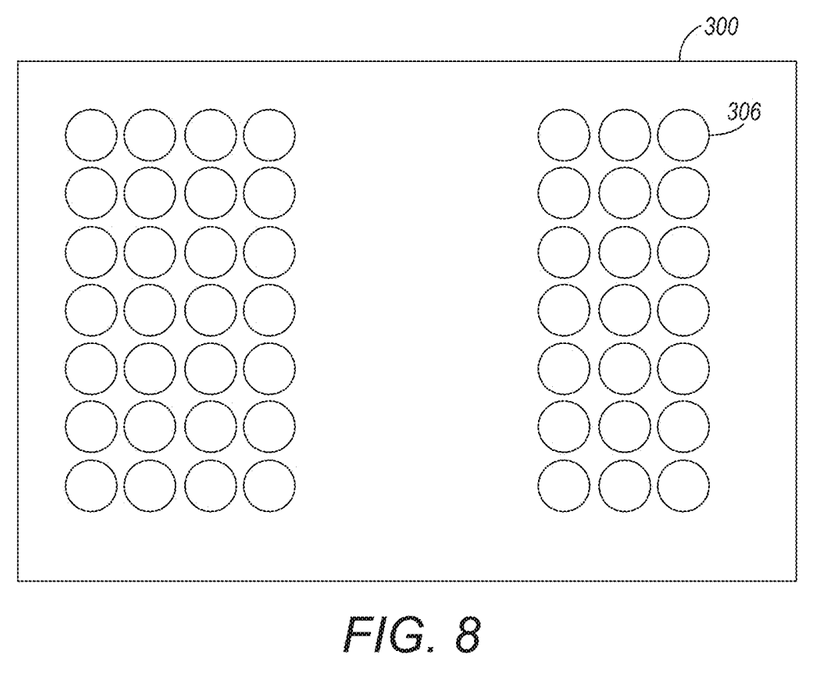
FIG. 8 shows a view of the outer surface of a central fed roller.

FIG. 7 shows an embodiment of the central fed roller in a filament extension atomizer. The roller 300 receives fluid through the hollow central channel and then as the roller rotates, the liquid reaches the surface of the roller. As the surface of the roller enters the nip 402 between the rollers 300 and 400, the liquid contacts the roller 400. It then stretches between the two rollers as the rotate away from each other, forming the filaments and bursting into the spray of droplets. The surface 307 of the roller has an array of holes such as 306 shown in FIG. 8

In this manner, these systems can employ liquids with a higher surface tension than would otherwise work with a doctor blade or a spinning surface. By replacing a roller and connecting it fluidically to a reservoir of the liquid, a system can provide a spray of droplets using these fluids.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An atomization system, comprising:
   a fluid reservoir;
   a pair of rollers, at least one of the rollers having:
      a central feed channel, the channel fluidically connected to the fluid reservoir;
      an array of holes on a surface of the roller; and
      vanes connecting the channels to the holes;
   a nip formed between the rollers; and
   a receiving surface positioned to receive droplets formed when liquid exits the holes, stretches between the rollers as they counterrotate to form filaments and the filaments break into droplets.

2. The atomization system of claim 1, further comprising a pressure controller to set a pressure of the liquid to control a size of the droplets.

3. The atomization system of claim 1, further comprising multiple supply channels fluidically connected to the central feed channel, wherein each supply channel is at a different fluid pressure.

4. The atomization system of claim 3, further comprising a valve to selectively connect one of the supply channels to the central feed channel.

5. The atomization system of claim 1, wherein each of the holes of the array of holes are of a same size.

6. The atomization system of claim 1, wherein at least some of the holes of the array of holes are of different sizes.

7. The atomization system of claim 1, further comprising a controller to regulate pressure between the central feed channel and the fluid reservoir.

8. The atomization system of claim 1, wherein the vanes have different sizes to control sizes of the droplets.

9. A method of generating droplets, comprising:
   providing a fluid to a first roller having a central feed channel, vanes between the central feed channel and a surface of the roller, the surface of the roller having holes connected to the vanes to form surface droplets; and
   contacting the first roller with a second roller, the second roller to pull the fluid away from the first roller to form a filament, and stretching the filament to form droplets.

10. The method of claim 9, further comprising controlling a back pressure of the fluid to control a size of the surface droplets.

11. The method of claim 10, wherein controlling a back pressure comprises controlling the back pressure to cause the surface droplets to have a negative film thickness.

12. The method of claim 9, wherein controlling a back pressure comprises controlling the back pressure differently in each vane.

13. The method of claim 12, wherein controlling a back pressure differently comprising altering a geometry of each vane.

* * * * *